US008174547B2

(12) United States Patent
Yoneda et al.

(10) Patent No.: US 8,174,547 B2
(45) Date of Patent: May 8, 2012

(54) TABLET COMPUTER EQUIPPED WITH MICROPHONES

(75) Inventors: Masaharu Yoneda, Yokohama (JP); Hironari Nishino, Hachiouji (JP); Hidetoshi Mori, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 485 days.

(21) Appl. No.: 12/538,636

(22) Filed: Aug. 10, 2009

(65) Prior Publication Data

US 2010/0066665 A1  Mar. 18, 2010

(30) Foreign Application Priority Data

Sep. 16, 2008  (JP) ................................. 2008-236394

(51) Int. Cl.
*G09G 5/00* (2006.01)
(52) U.S. Cl. .......... 345/903; 345/1.3; 345/901; 345/905
(58) Field of Classification Search ................... 345/1.3, 345/901, 903, 905
See application file for complete search history.

(56) References Cited

U.S. PATENT DOCUMENTS

| | | | |
|---|---|---|---|
| 5,982,906 A * | 11/1999 | Ono | 381/94.2 |
| 7,206,196 B2 * | 4/2007 | Ghosh et al. | 361/679.09 |
| 7,688,306 B2 * | 3/2010 | Wehrenberg et al. | 345/158 |
| 2007/0229555 A1 * | 10/2007 | Tsuji et al. | 345/694 |
| 2007/0242421 A1 * | 10/2007 | Goschin et al. | 345/173 |

FOREIGN PATENT DOCUMENTS

JP  2003-223198  8/2003

* cited by examiner

*Primary Examiner* — Kevin M Nguyen
(74) *Attorney, Agent, or Firm* — Antony P. Ng; Yudell Isidore Ng Russell PLLC (57) ABSTRACT

A tablet PC capable of providing continuous utilization of a sound signal collected from a microphone without requiring any user intervention when a use mode thereof has been changed from a PC use mode to a tablet use mode is disclosed. The tablet PC includes a set of microphones to form a microphone array. The tablet PC is able to operate in a sound emphasis mode wherein sound signals collected from the microphones are processed while forming an emphasis space, and to operate in a non-processing mode wherein the sound signals are processed without forming the emphasis space. When a user manipulates a chassis orientation of the tablet PC from a PC use mode to a tablet use mode, the tablet PC operates to process the emphasis space so that the sound signals collected by the microphones can be utilized in the tablet use mode.

15 Claims, 7 Drawing Sheets

TABLET COMPUTER EQUIPPED WITH MICROPHONES

PRIORITY CLAIM

The present application claims benefit of priority under 35 U.S.C. §§120, 365 to the previously filed Japanese Patent Application No. JP2008-236394 entitled, "Tablet computer equipped with microphone and control method" with a priority date of Sep. 16, 2008, which is incorporated by reference herein.

BACKGROUND OF THE INVENTION

1. Technical Field

The present invention relates to tablet computers in general, and in particular to a convertible tablet computer equipped with microphones, and more particularly, relates to a method for controlling processing of sound signals collected by the microphones on a tablet computer according to a use mode of the tablet computer.

2. Description of Related Art

Among personal computers (PCs), those having a thin size and allowing manipulations thereof with pen input on a display thereof are called tablet PCs. Tablet PCs can provide equivalent functions to notebook computers (laptop PC) while being operated with pen input without the usage of a keyboard. The tablet PCs come in two basic types: convertibles and pure tablets. The convertibles have a structure that allows a laptop PC equipped with a keyboard to be used as a tablet PC by changing a direction of a display of the laptop PC. The pure tablets have a structure that is not equipped with a keyboard and allows operations thereof with only pen input.

Among tablet PCs, there is one that converts user's sound signals collected by microphones into digital data and performs sound recognition thereon to be used for various purposes. Since sound input environment generally includes a source of noise, in order to obtain high sound recognition accuracy, it is necessary to separate or emphasize a target sound from or against noise. In this regard, there is a known technique called beamforming that collects sound with a set of microphones constituting a microphone array and emphasize a target sound by using a phase difference of sound signals received by the respective microphones based on a direction of a sound source and a distance between the microphones, thereby suppressing noise. The beamforming processes sound signals by increasing sensitivity to a target sound from a particular direction with respect to the microphone array while decreasing sensitivity to noise from other directions.

In convertible tablet PCs, the position of a user's mouth with respect to a microphone is different between a case of using the tablet PCs with keyboard input (i.e., PC use mode) and a case of using them with pen input (i.e., tablet use mode). Therefore, in some cases, even when the sensitive direction of beamforming is set so that the sound uttered from the user's mouth is emphasized in the PC use mode, the sound is not emphasized in the tablet use mode but suppressed. When it is unable to recognize the sound after the use mode is changed from the PC use mode to the tablet use mode, the user mistakenly attributes the inability to recognize the sound to a device failure. Although improved convenience can be provided because when the user stops the beamforming function, the tablet PC is able to utilize the sound that is not emphasized and thus has noise mixed therein; manipulating the beamforming function every changing of the use mode involves complication.

SUMMARY OF THE INVENTION

The present invention provides a convertible tablet computer capable of enabling continuous utilization of a sound signal collected from a microphone without requiring a user's intervention when a use mode is changed from a PC use mode to a tablet use mode. In accordance with a preferred embodiment of the present invention, a convertible tablet computer includes a set of microphones constituting a microphone array. The tablet computer is capable of operating in a sound emphasis mode in which sound signals collected by the microphones are emphasized while forming an emphasis space or operating in a non-processing mode, and the sound signals are processed without forming the emphasis space. When the tablet computer in a PC use mode is caused to operate in the sound emphasis mode, a direction of an axis of directivity and a magnitude of a directivity coverage angle of an emphasis space are set to the optimum values so that the position of a user's mouth expected in the PC use mode is located within the emphasis space and unnecessary noise is not contained. When the user manipulates a display casing of the tablet computer to change the use mode setting from the PC use mode to the tablet use mode, the tablet computer detects the change.

When the user's mouth is positioned outside the emphasis space in the tablet use mode, the tablet computer is unable to utilize the sound signals collected by the microphones. Upon detecting the change in the use mode, the tablet computer is operated to process the emphasis space so that the sound signals collected by the microphones can be utilized in the tablet use mode. As a result, the tablet computer is able to continuously utilize the sound signals collected by the microphones without requiring the user's intervention even when the use mode has been changed.

The relation between the position of the user's mouth and the axis of directivity changes depending on a tilt angle of a casing of the tablet computer. Therefore, by detecting the tilt angle of the tablet computer, the direction of the axis of directivity may be changed in accordance with the tilt angle so that the user's mouth is positioned within the emphasis space. When the user carries the tablet computer to use it in the tablet use mode, a shaking may occur in the tablet computer. When the casing of the tablet computer is shaken, the axis of directivity and the position of the user's mouth change with the shaking. In this case, by setting the magnitude of the directivity coverage angle of the emphasis space so as to be greater than the value in the PC use mode, it is possible to make the user's mouth positioned within the emphasis space even in occurrence of the shaking.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Referring now to the drawings and in particular to FIGS. 1A to 1D, there are depicted perspective views illustrating an outer appearance of a tablet PC 10, according to an embodiment of the present invention. The tablet PC 10 is of a convertible type and includes a system casing 11 and a display casing 13 that are both substantially rectangular. The system casing 11 is provided with an input unit 15 that is equipped with a keyboard and a pointing device. The display casing 13 is provided with an input display panel 17 in which a touch panel input portion is overlaid on a liquid crystal display (LCD), thereby enabling screen display and touch pen input.

Figure 1A:
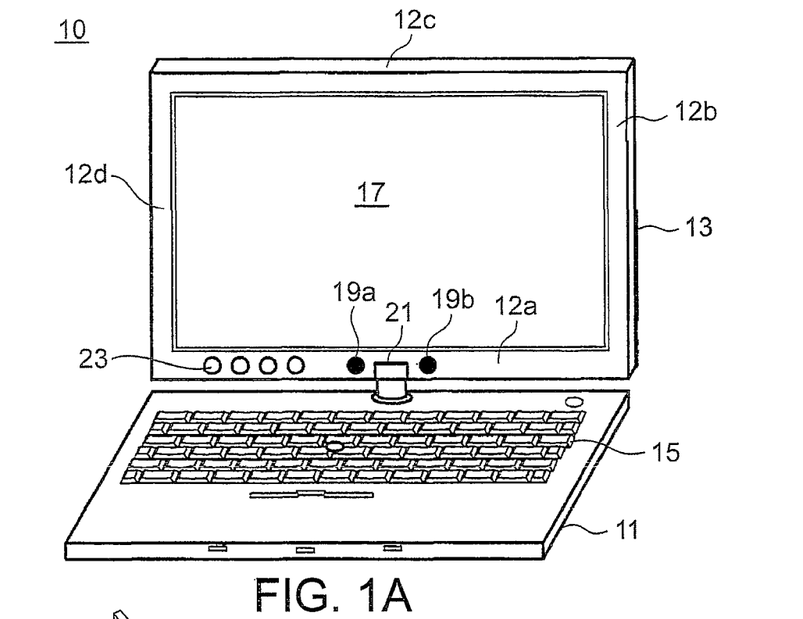
FIGS. 1A to 1D are perspective views of a tablet PC, according to an embodiment of the present invention.
Figure 1B:
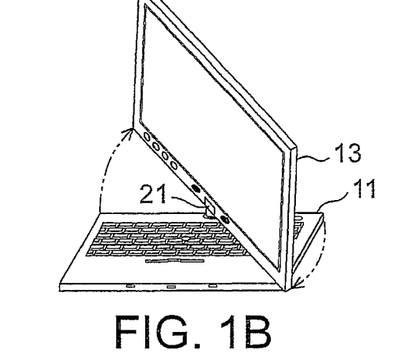
Figure 1C:
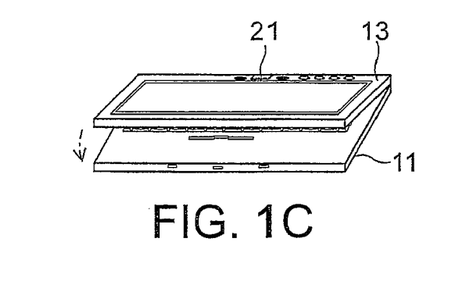
Figure 1D:
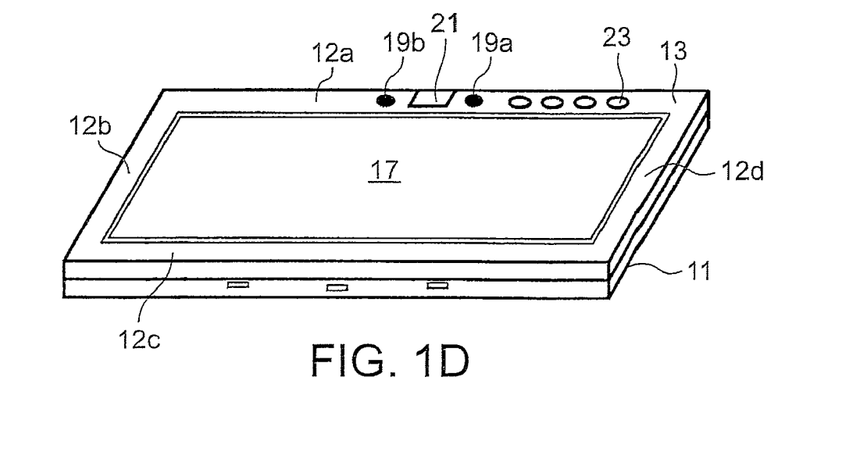

The system casing 11 and the display casing 13 are joined by a joint portion 21 at the center of respective end portions. The joint portion 21 is configured to pivotably support these casings in the direction where they are opened and closed relative to each other. Moreover, the display casing 13 is configured to be rotatable about the joint portion 21 by at least 180 degrees in a state where the display casing 13 is opened from the system casing 11. In a PC use mode illustrated in FIG. 1A, the tablet PC 10 can be used in a similar fashion to a general laptop PC while allowing manipulations with respect to the input unit 15 that includes a keyboard and a mouse. When the display casing 13 is rotated as illustrated in FIG. 1B and is then folded so that the display casing 13 is overlaid on the system casing 11 as illustrated in FIG. 1C and the input display panel 17 is directed to the outside, a tablet use mode as illustrated in FIG. 1D is achieved. In the tablet use mode, users are able to use the tablet PC 10 while inputting manipulations with respect to the input display panel 17 using a touch pen or fingers.

The display casing 13 includes four edge frames 12a, 12b, 12c, and 12d in the peripheral portion of the input display panel 17. A displaying direction rotating button 23 is provided on the edge frame 12a. Whenever a user presses the displaying direction rotating button 23 once, the direction of the screen displayed on the input display panel 17 is rotated in a predetermined direction by 90 degrees. The rotation direction may be set to a clockwise direction or a counterclockwise direction or may be selected from several directions. When the rotation of 180 degrees is performed, the 180-degree rotation may be achieved at once rather than achieving it with each rotation of 90 degrees.

The edge frame 12a also has two omni-directional microphones 19a and 19b formed thereon. The microphones 19a and 19b constitutes a microphone array for forming a sound emphasis space at the front of the display casing 13 by a beamforming technique. Although the present embodiment uses two microphones, the microphone array may be formed with three or more microphones.

I. Hardware Configuration

Figure 2:
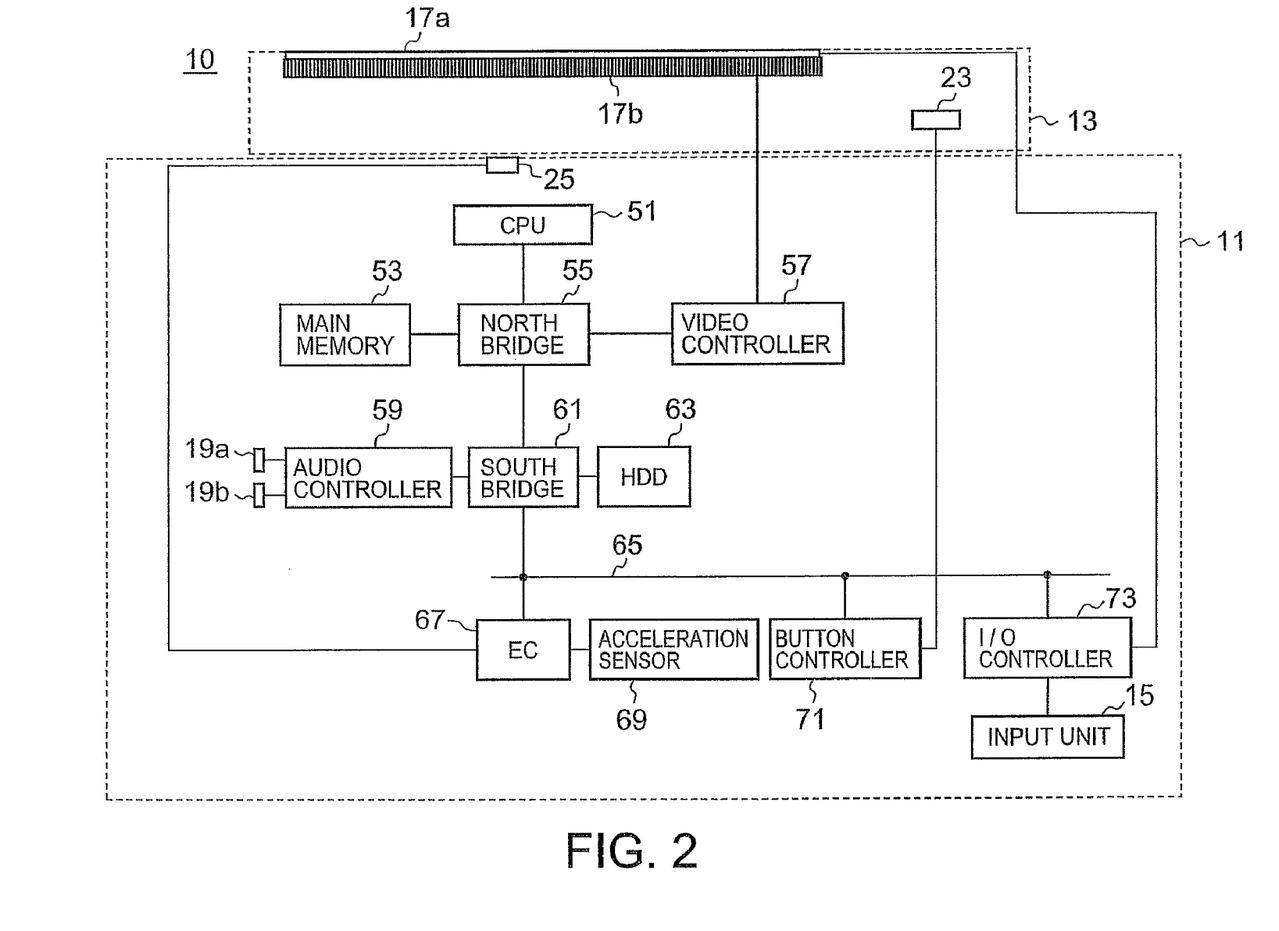
FIG. 2 is a block diagram of the hardware configuration of a tablet PC, according to an embodiment of the present embodiment.

FIG. 2 is a block diagram illustrating a schematic hardware configuration of the tablet PC 10. A CPU 51 is an arithmetic processing device performing the central function of the tablet PC 10 and executes an OS, a BIOS, a device driver, or application programs. The CPU 51 controls devices connected to a chip set mainly including a north bridge 55 and a south bridge 61 via various buses. The north bridge 55 has a memory controller function for controlling an operation of accessing a main memory 53, a data buffer function for absorbing a difference in a data transfer rate between buses, and the like.

The main memory 53 is a volatile RAM used as a read area of programs executed by the CPU 51 and a work area to which processed data are written. A video controller 57 is provided with a video chip and a VRAM (both of which are not illustrated) and configured to receive a drawing command from the CPU 51 to produce images to be drawn and write the images in the VRAM and to send images read out from the VRAM to a display 17b as a drawing data. The video controller 57 is also capable of executing a function of rotating the direction of the screen displayed on the display 17b in a counterclockwise direction by 90 degrees in response to a manipulation of the displaying direction rotating button 23.

The south bridge 61 is connected to the north bridge 55. The south bridge 61 functions as a bridge between the north bridge 55 and an LPC bus 65. The south bridge 61 also functions as a serial ATA interface and a USB interface (not illustrated) and is connected to a hard disc drive (HDD) 63 via the serial ATA interface and to an audio controller 59 via the USB interface. In the HDD 63, program necessary for the tablet PC 10 to implement the present invention is stored. The program may be stored in a non-volatile memory other than the HDD 63.

The microphones 19a and 19b are connected to the audio controller 59. The LPC bus 65 is connected to an embedded controller (EC) 67, a button controller 71, and an I/O controller 73. The EC 67 is a microcomputer configured by an 8 to 16 bit CPU, a ROM, a RAM, and the like, and is further provided with a multi-channel A/D input terminal, a multi-channel D/A output terminal, a timer, and a digital input/output terminal. The EC 67 is capable of executing a program for managing an operating environment of the tablet PC 10 independently of the CPU 51. The EC 67 is connected to an acceleration sensor 69 and a mode switch 25.

The acceleration sensor 69 is configured to measure an acceleration externally applied to the tablet PC 10 to output an analog voltage corresponding to the acceleration to the A/D input terminal of the EC 67. The EC 67 performs A/D conversion on the voltage input from the acceleration sensor 69 to obtain an acceleration value. The obtained acceleration value is stored in the RAM of the EC 67 and is periodically read by the CPU 51 executing an application program that requires the acceleration value. The mode switch 25 is configured to generate a tablet signal upon detecting that the tablet PC 10 is completely set to be usable in the tablet use mode as illustrated in FIG. 1D and to generate a PC signal upon detecting that the use mode is completely changed from the tablet use mode to the PC use mode, thereby sending a notification to the EC 67. Upon receiving the tablet signal or the PC signal from the mode switch 25, the EC 67 sends an interrupt to the CPU 51 to send a notification to a later-described control program.

The button controller 71 is connected to the displaying direction rotating button 23. The button controller 71 detects an input from the displaying direction rotating button 23 to send a notification to the video controller 57. Then, the video controller 57 changes the direction of the display screen displayed on the display 17*b* based on the notification. The I/O controller 73 is connected to the input unit 15 which is used in the PC use mode and to a touch panel input portion 17*a* which is used in the tablet use mode. The touch panel input portion 17*a* and the display 17*b* constitutes the input display panel 17, as illustrated in FIGS. 1A to 1D.

It should be noted that FIGS. 1 and 2 merely illustrate a configuration and connecting relation of main hardware components concerned with the present embodiment in the simplified forms in order to describe the present embodiment. In addition to the devices described hereinabove, many other devices are used to construct the tablet PC 10, but they are well known to a person skilled in the art, and hence detailed description thereof is omitted here. A configuration in which multiple blocks shown in the drawing are integrated into one circuit or device, and a configuration in which conversely one block is divided into multiple integrated circuits or devices are included in the scope of the present invention as long as the configuration can arbitrarily be selected by the person skilled in the art. Further, types of the buses, the interfaces, or the like which connect the devices to one another are merely examples, and other connections are included in the scope of the present invention as long as the person skilled in the art can arbitrarily select the connections.

II. Software Configuration

Figure 3:
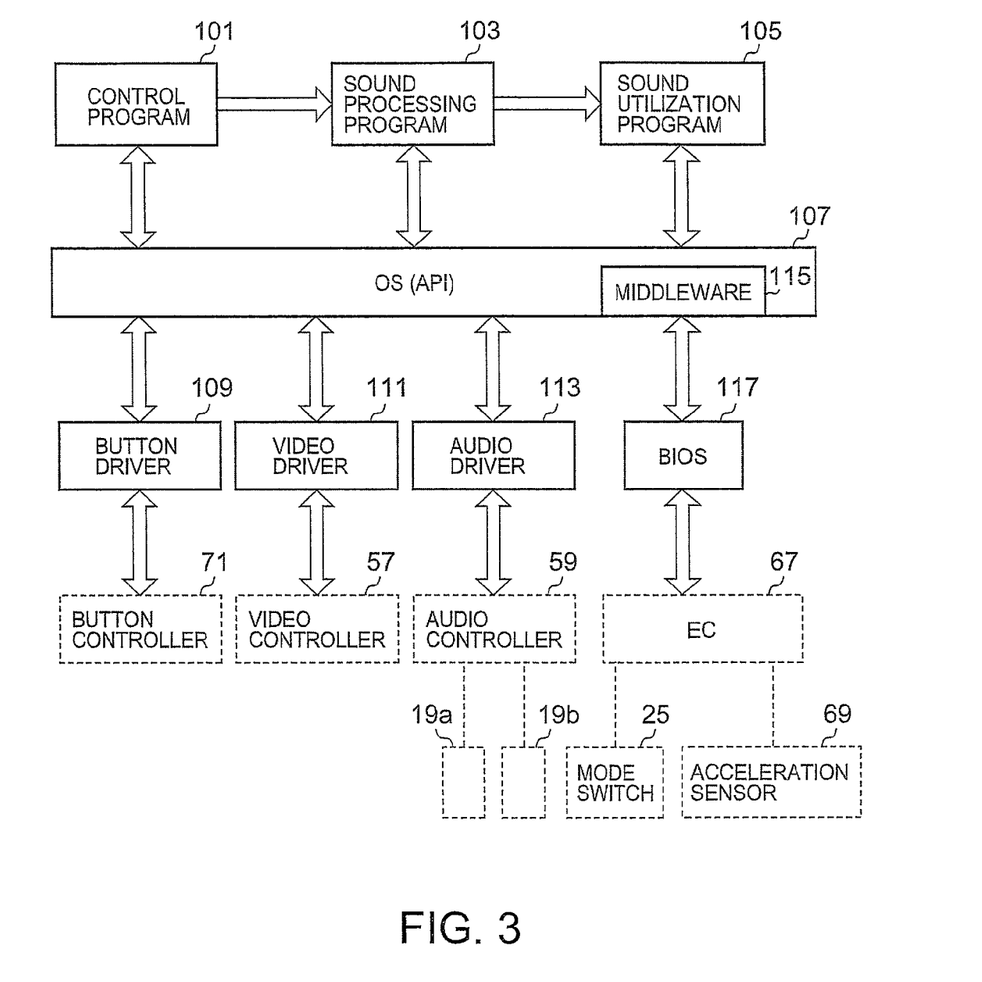
FIG. 3 is a block diagram of the software configuration related to an embodiment of the present invention.

FIG. 3 is a block diagram illustrating a software configuration related to the present embodiment. The software programs illustrated in FIG. 3 are stored in the HDD 63 and read into the main memory 53 upon being executed by the CPU 51. A control program 101, a sound processing program 103, and a sound utilization program 105 are programs which are run on an OS 107 to exchange data with other programs via an API of the OS 107 or control hardware components, thereby performing tasks that the user intends to do. The control program 101 controls the sound processing program 103 in response to the PC signal or the tablet signal received from the mode switch 25 so that the sound utilization program 105 is able to utilize the sound data in any of the PC use mode and the tablet use mode. A description of this control method will be provided later.

The control program 101 periodically receives the acceleration value detected by the acceleration sensor 69 from the EC 67 and calculates and holds a tilt angle of the system casing 11 in the tablet use mode being tilted from its horizontal state. The tilt angle is calculated with respect to two axial directions that cross each other at right angles on a plane of the input display panel 17. The control program 101 makes a determination as to whether or not the system casing 11 is shaking, based on the magnitude of the tilt angle which changes with time. The control program 101 receives information on the direction of the current display screen displayed on the display 17*b* via the video driver 111.

The sound processing program 103 is a program for emphasizing a target sound and suppressing a non-target sound which is a directional noise by the use of a microphone array technique. The sound processing program 103 is configured to receive the sound signals collected by the microphones 19*a* and 19*b* from the audio driver 113 and perform arithmetic processing on the received sound signals based on a distance between the microphones 19*a* and 19*b* and a phase difference between both signals resulting from the direction of the sound source, thereby forming an emphasis space and a suppression space of the sound signals at the front of the microphones 19*a* and 19*b*. A sound processing technique by the sound processing program 103 is called beamforming.

In the beamforming using the microphone array technique, although various techniques, for example, Delay and Sum beamforming, subtractive beamforming, adaptive beamforming, and Griffiths-Jim beamforming have been introduced, the present invention is not particularly limited to these techniques. Moreover, in order to form the emphasis space and the suppression space at the front of the display casing 13, an audio controller incorporating therein the arithmetic function of the sound processing program 103 may be employed so that the space forming operation is processed at the hardware level. Furthermore, other well-known sound emphasis techniques different from the beamforming that forms the emphasis space and the suppression space to separate a target sound from directional noise may be employed.

The sound processing program 103 has an interface to the control program 101 and the sound utilization program 105 which operate on an application layer. The sound utilization program 105 is a program that performs tasks such as chatting for realizing real-time character-based conversation through a computer network, IP-phone calling, or text inputs by the use of user's sound signals collected by the microphones 19*a* and 19*b*. The sound utilization program 105 is configured to receive emphasized sound data from the sound processing program 103 when the sound processing program 103 is being executed while receiving sound data generated by the audio controller 59 from the sound signals collected by the omnidirectional microphones 19*a* and 19*b* from the audio driver 113 when the sound processing program 103 is not being executed.

The button driver 109 controls the button controller 71 to transmit signals of a manipulation button such as the displaying direction rotating button 23 to the OS 107. The video driver 111 controls the video controller 57 to process image signals displayed on the display 17*b*. Upon receiving an event that changes a displaying direction of the screen of the display 17*b* from the OS 107, the video driver 111 controls the video controller 57 to change the displaying direction.

When the direction of the display screen is changed by the video driver 111, the OS 107 sends a notification to the control program 101 to inform that the screen setting has been changed. Upon receiving the notification, the control program 101 makes inquiries to the OS 107 for setting information of the screen to obtain information on a new screen display method. The audio driver 113 controls the audio controller 59 based on instructions from the control program 101 to transmit the sound signals converted to the digital data to the sound processing program 103 or the sound utilization program 105. A middleware 115 is a program for enabling the control program 101 to communicate with the EC 67.

III. Emphasis Space

Figure 4A:
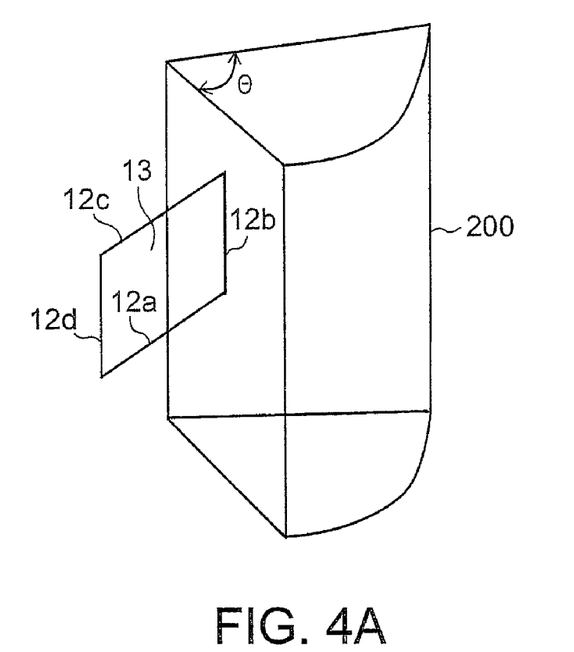
FIGS. 4A and 4B are views for describing the aspects of an emphasis space formed at the front of a display casing by a sound processing program.
Figure 4B:
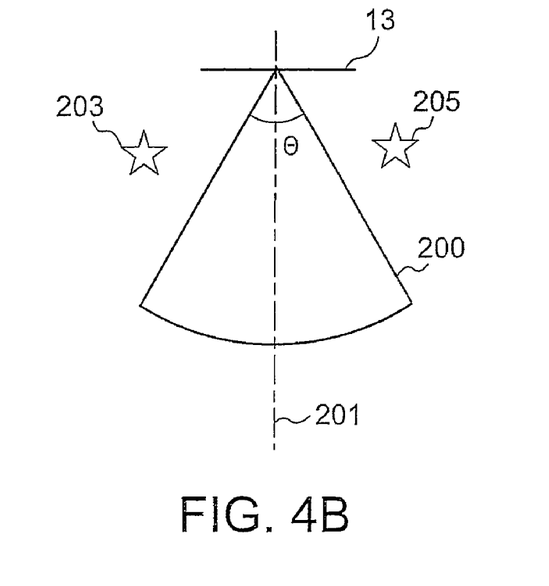

FIGS. 4A and 4B are views for describing the aspects of an emphasis space formed at the front of the display casing 13 by the sound processing program 103. FIG. 4A is a perspective view, and FIG. 4B is a top plan view of the display casing 13 that is opened perpendicular to the system casing 11. The emphasis space 200 is defined as a space where the sound processing program 103 performs arithmetic processing on sound data corresponding to the sound signals collected by the microphones 19a and 19b so as to emphasize sound from a sound source existing around the display casing 13.

In the vicinity of the display casing 13, the emphasis space 200 is configured to laterally widen into a sector shape from the plane of the display casing 13 while vertically extending into a cylindrical shape. In other words, the emphasis space 200 has a partly cut cylindrical shape which is cut out along two planes being parallel to a central axis of the cylinder and forming a predetermined angle with respect to the central axis. A central axis 201 (i.e., axis of directivity) of the emphasis space 200 divides the emphasis space 200 evenly and laterally on a plane perpendicular to a front surface of the display casing 13. A directivity coverage angle θ representing the degree of lateral widening of the emphasis space 200 is set to 60 degrees when the tablet PC 10 is in the PC use mode, and the axis of directivity 201 is set to a direction perpendicular to the front surface of the display casing 13. The front surface of the display casing 13 substantially corresponds to a front surface of the input display panel 17.

A distance (a radius of the sector) of the emphasis space 200 from the display casing 13 and a height range thereof depend on the capabilities of the microphones 19a and 19b and the audio controller 59. Among spaces around the tablet PC 10, a space other than the emphasis space 200 where positions 203 and 205 are located is defined as a suppression space. Sound signals from sound sources positioned in the suppression space are processed to be suppressed or cancelled by the sound processing program 103. When a user uses the tablet PC 10 in the PC use mode, the user generally utters sound into the microphones 19a and 19b with the user's face being positioned at the front of the display casing 13; therefore, the user's mouth serving as a sound source is positioned within the emphasis space 200. As a result, the user's sound is emphasized and noise from a sound source positioned in the suppression space is suppressed.

The direction of the axis of directivity and the magnitude of the directivity coverage angle θ of the emphasis space are set to the optimum values so as to make sure that the user's mouth in the PC use mode is positioned within the emphasis space while preventing the emphasis space from expanding more than necessary and thus preventing noise from being mixed therein. However, when the tablet PC 10 is used in the tablet use mode, the configuration of the emphasis space 200 illustrated in FIGS. 4A and 4B has many disadvantages. When the user uses the tablet PC 10 in the tablet use mode, the user folds down the display casing 13 as illustrated in FIG. 1D and then performs touch pen manipulations with one hand while holding the system casing 11 with the other hand. At this moment, the user's body is generally positioned on the side of the edge frame 12b or 12d.

In such a case, as is obvious from FIG. 4A, the user's mouth is definitely in the suppression space. When the user utters sound into the microphones 19a and 19b with the mouth being positioned in the suppression space, the sound data are hardly transmitted to the sound utilization program 105 and the user may think that something is wrong with the sound recognition system. In this case, the user may stop execution of the sound processing program 103 by manipulating a user interface window screen of the sound processing program 103.

The audio driver 113 is configured so that, when the execution of the sound processing program 103 stops, the sound data are directly transmitted from the audio driver 113 to the sound utilization program 105. This means that both the emphasis space 200 and the suppression space are cleared. Then, the sound utilization program 105 is able to utilize the sound data that are not emphasized. In the present specification, a state where the sound processing program 103 is executed and the sound utilization program 105 utilizes the emphasized sound data is referred to as a sound emphasis mode, and a state where the execution of the sound processing program 103 is stopped and the sound utilization program 105 utilizes the sound data that are not emphasized is referred to as a non-processing mode.

In the present invention, when the use mode is changed to the tablet use mode from a state where the tablet PC 10 is in the PC use mode and operates in the sound emphasis mode, the sound data are continuously supplied to the sound utilization program 105 without intervention of user's manipulations, thereby enabling continuous utilization of the sound data. According to a first method of the present invention, the operation mode is automatically changed from the sound emphasis mode to the non-processing mode upon detecting that the use mode is changed to the tablet use mode. According to a second method, both or either one of the direction of the axis of directivity and the magnitude of the directivity coverage angle is changed while maintaining the sound emphasis mode so that the user is not positioned in the suppression space. In any of the two above-mentioned methods, changes are made to the emphasis space created in the PC use mode.

IV. First Embodiment

Figure 5:
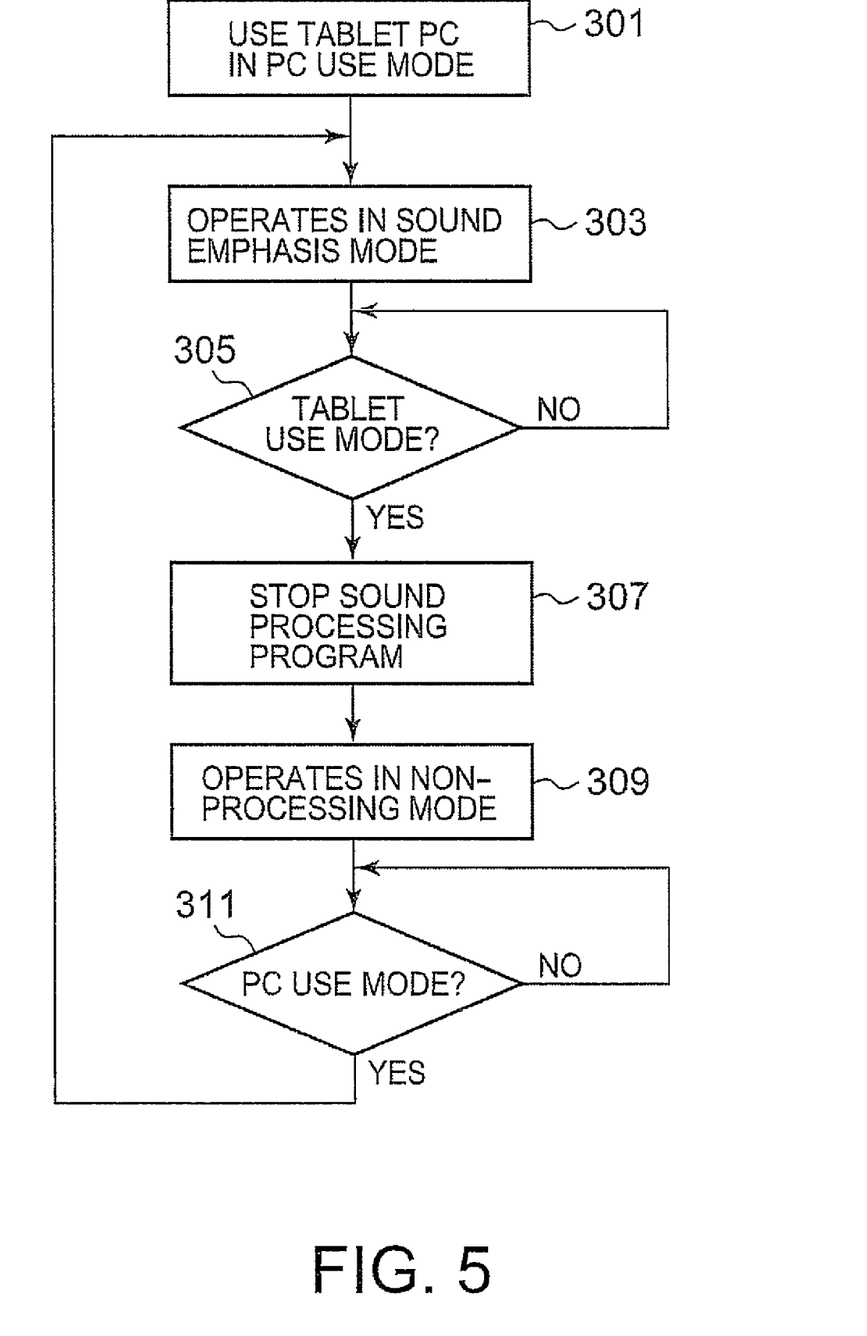
FIG. 5 is a flowchart illustrating a method for transitioning from a sound emphasis mode to a non-processing mode when a use mode of the tablet PC has been changed from a PC use mode to a tablet use mode.

FIG. 5 is a flowchart of a method for transitioning from a sound emphasis mode to a non-processing mode when a use mode of the tablet PC 10 has been changed from a PC use mode to a tablet use mode. In block 301, the display casing 13 of the tablet PC 10 is set to the PC use mode as illustrated in FIG. 1A. Since the EC 67 has already transmitted the PC signal to the control program 101, the control program 101 recognizes that the tablet PC 10 is presently set in the PC use mode. The sound processing program 103 and the sound utilization program 105 are read into the main memory 53 in advance.

In block 303, upon recognizing the use mode being set in the PC use mode, the control program 101 executes the sound processing program 103. Then, the sound processing program 103 forms the emphasis space 200 in which the axis of directivity 201 (illustrated in FIGS. 4A and 4B) is perpendicular to the front surface of the display casing 13 and the directivity coverage angle θ is set to 60 degrees. When the sound utilization program 105 is executed by the user, the sound data collected by the microphones 19a and 19b are supplied to the sound utilization program 105 after being emphasized via the audio driver 113 and the sound processing program 103.

In block 305, the control program 101 determines whether or not the user has changed the use mode of the tablet PC 10 to the tablet use mode (as illustrated in FIG. 1D) based on the tablet signal from the EC 67. In block 307, upon receiving the tablet signal from the EC 67, the control program 101 stops the execution of the sound processing program 103. In block 307, after the control program 101 sends a notification to the audio driver 113 to inform that the sound processing program 103 has stopped, the audio driver 113 transmits the sound data directly to the sound utilization program 105. When the sound data are directly transmitted from the audio driver 113 to the sound utilization program 105, the OS 107 may control the transmit destination of the sound data from the audio driver 113 by monitoring the execution status of the sound processing program 103 without any intervention from the control program 101. In block 309, the tablet PC 10 operates in the non-processing mode.

In the non-processing mode, since the emphasis space and the suppression space are not formed, although the emphasis processing for emphasizing the target sound from the noise is not performed on the sound signals collected by the omnidirectional microphones 19a and 19b, the sound utilization program 105 is able to continuously utilize sound data because the user's mouth is not positioned in the suppression space. In block 311, the control program 101 makes a determination as to whether or not the user has changed the use mode of the tablet PC 10 to the PC use mode (as illustrated in FIG. 1A) based on the PC signal from the EC 67. Upon receiving the PC signal from the EC 67, the control program 101 transitions to block 303 to execute the sound processing program 103 to be prepared for the PC use mode. With the method of the present invention, the user is not required to manipulate the user interface window screen.

V. Second Embodiment

Figure 6:
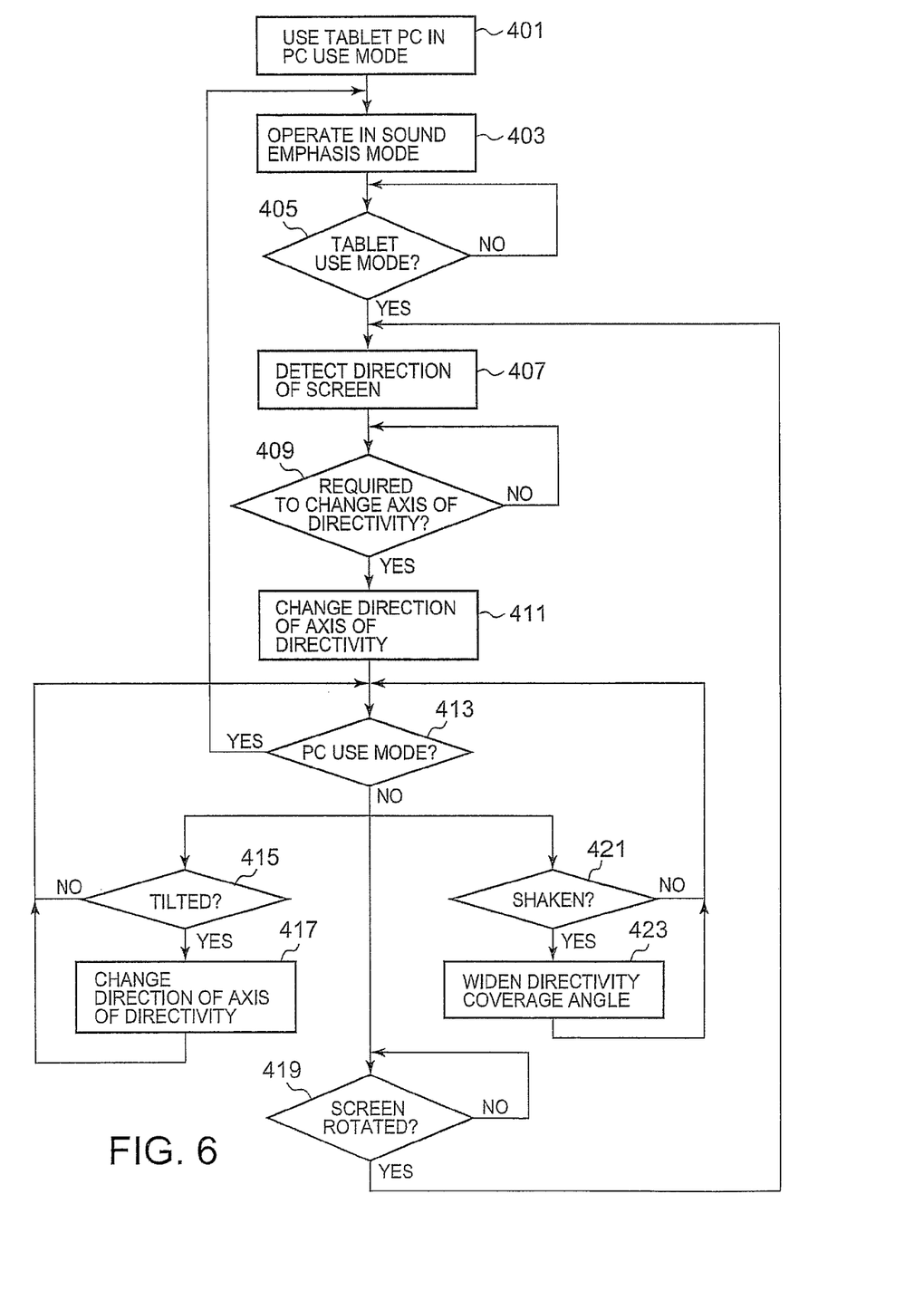
FIG. 6 is a flowchart illustrating a method for changing both or either one of a direction of an axis of directivity and a magnitude of a directivity coverage angle while maintaining the sound emphasis mode when the use mode of the tablet PC has been changed from the PC use mode to the tablet use mode.

FIG. 6 is a flowchart of a method for changing both or either one of a direction of an axis of directivity 201 and a magnitude of a directivity coverage angle θ while maintaining the sound emphasis mode when the use mode of the tablet PC 10 has been changed from the PC use mode to the tablet use mode. FIGS. 7A to 7D illustrate the aspects of changing the direction of the axis of directivity 201 or the magnitude of the directivity coverage angle θ. In FIGS. 7A to 7D, the user 501 is positioned on the side of the edge frame 12b or 12d of the display casing 13. Although the directivity coverage angle θ is illustrated narrow for better understanding of the description in FIGS. 7A to 7C, the actual directivity coverage angle θ is 60 degrees as employed in the PC use mode.

Blocks 401 to 405 in FIG. 6 are the same as blocks 301 to 305 in FIG. 5. In block 407, the control program 101 having received the tablet signal from the EC 67 recognizes the relation between the vertical direction of the screen presently displayed on the input display panel 17 and the edge frame. Data regarding the vertical direction of the screen are transmitted from the video driver 111 to the control program 101 whenever the direction of the screen changes. The control program 101 makes a determination under assumption that the user 501 is positioned below the screen.

In block 409, the control program 101 determines that it is necessary to change the direction of the axis of directivity 203 of the emphasis space 200 when the upper side of the screen is positioned on the side of the edge frame 12b or 12d, and then, the process proceeds to block 411. When the upper side of the screen is determined to be on the side of the edge frame 12a or 12c, the control program 101 does not change the direction of the axis of directivity 203 but maintains the direction of the axis of directivity 203 and the directivity coverage angle θ (60 degrees) in the PC use mode. As illustrated in FIG. 4A, when the user is positioned on either side of the edge frame 12a or the edge frame 12c, since the user's mouth is positioned within the emphasis space 200 in the PC use mode, the emphasized sound data are supplied to the sound utilization program 105.

Figure 7A:
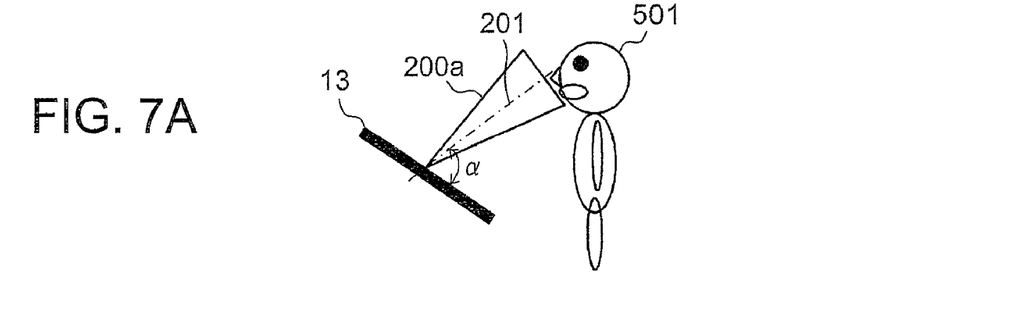
FIGS. 7A to 7D are views illustrating the aspects of changing the direction of the axis of directivity or the magnitude of the directivity coverage angle.

When using the tablet PC in the tablet use mode, in many cases, the user holds the tablet PC with one hand while having the system casing 11 in a slightly tilted state. In block 411, the control program 101 instructs the sound processing program 103 to change the axis of directivity of the emphasis space 200a to be directed to the user's face (as illustrated in FIG. 7A) based on a typical tilt angle of the system casing 11 used when the user holds the system casing 11. The sound processing program 103 tilts the system casing 11 towards the lower side of the screen to a predetermined angle so that an angle a of the axis of directivity 201 with respect to the front surface of the display casing 13 becomes smaller than 90 degrees. The directivity coverage angles of the emphasis spaces 200a to 200c are 60 degrees. In this manner, by changing the direction of the axis of directivity 201 so as to correspond to the direction where the user is positioned, based on the direction of the display screen, it is possible to prevent the user's mouth from being positioned in the suppression space. As such, the sound processing program 103 is able to continuously supply the sound data to the sound utilization program 105.

In block 413, the control program 101 determines whether or not the user has changed the use mode of the tablet PC 10 to the PC use mode (as illustrated in FIG. 1A) based on the PC signal from the EC 67. Upon receiving the PC signal from the EC 67, the control program 101 executes the sound processing program 103 to be prepared for the PC use mode in block 403.

In block 413, when the control program 101 recognizes that the tablet use mode is continued, the process proceeds to block 415, 419, or 421. The control program 101 periodically receives the acceleration information regarding the system casing 11 from the EC 67 and is thus aware of the posture of the system casing 11 at that moment and the tilt angle relative to the horizontal. In block 415, the control program 101 determines whether or not the system casing 11 is tilted towards the edge frame 12b or the edge frame 12c, on the basis of the typical tilt angle of the system casing 11 when the direction of the axis of directivity 201 was changed in block 411.

Figure 7B:
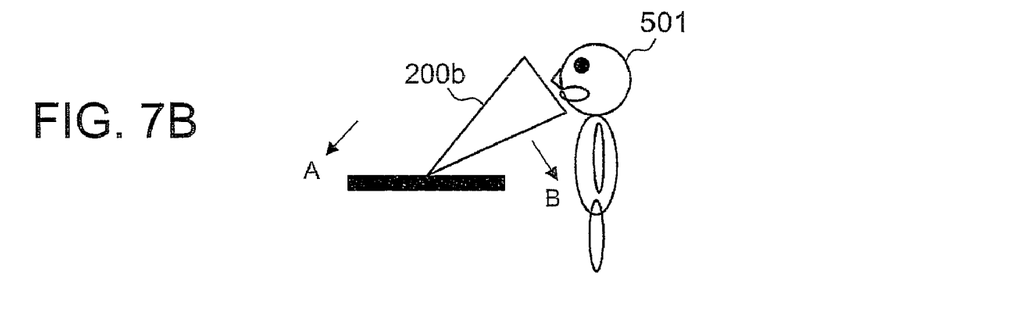
Figure 7C:
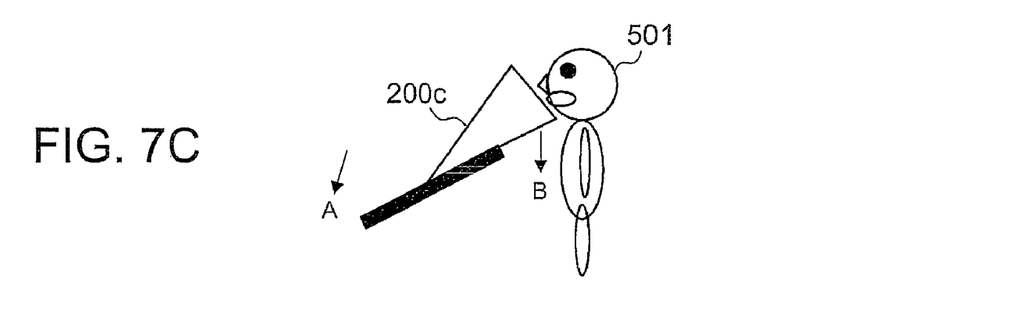

For example, when the user places the tablet PC 10 on the surface of a horizontal table as illustrated in FIG. 7B, there is a possibility that, in the direction of the axis of directivity 201 set in block 411, the user's mouth is positioned in the suppression space. Moreover, when the user further tilts the tablet PC 10 as illustrated in FIG. 7C, there is a possibility that the user's mouth is positioned in the suppression space unless the direction of the axis of directivity 201 is changed again. When it is determined in block 415 that the system casing 11 is tilted by a predetermined angle or more, the process proceeds to block 417 in which the control program 101 instructs the sound processing program 103 to change the angle a of the axis of directivity 201 with respect to the front surface of the display casing 13 by an angle corresponding to the tilt angle, and the process then proceeds to block 413.

The direction for changing the axis of directivity 201 is set to the direction of an arrow B that is reverse to the tilt direction of the system casing 11 indicated by an arrow A. When the tilt angle of the display casing 13 approaches the right angle, the angle a becomes larger than the value set in block 411. When the control program 101 determines in block 415 that the system casing 11 is not tilted by the predetermined angle or more, the process proceeds to block 413. In block 419, when the displaying direction rotating button 23 is manipulated, the video driver 111 sends an interrupt to the CPU 51 to send information on the present vertical direction of the display screen to the control program 101 and the flow proceeds to block 407. In block 407, when the vertical direction of the screen is changed to the direction of the edge frame 12b or the edge frame 12d, the direction of the axis of directivity is changed in block 409.

Figure 7D:
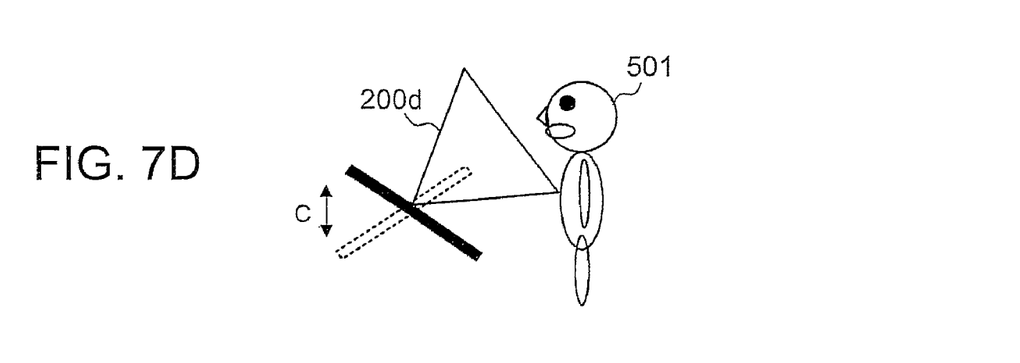

In block 421, the control program 101 determines whether or not the system casing 11 is shaken, based on the acceleration information that is periodically measured. When it is determined that the system casing 11 is shaken in the direction of an arrow C as illustrated in FIG. 7D, the process proceeds to block 423 in which the control program 101 instructs the sound processing program 103 to increase the directivity coverage angle θ to be greater than 60 degrees so that the user's mouth is positioned within the emphasis space even when the system casing 11 is shaken. In block 421, when the control program 101 determines that the system casing 11 is not shaken, if the directivity coverage angle θ at that moment is expanded to be greater than 60 degrees, the directivity coverage angle θ is returned to 60 degrees and the process proceeds to block 413.

As has been described, the present invention provides a method for controlling processing of sound signals collected by the microphones on a tablet computer according to a use mode of the tablet computer.

It is also important to note that although the present invention has been described in the context of a computer system, those skilled in the art will appreciate that the method of the present invention is capable of being distributed as a computer program product via a computer readable medium such as a compact disc.

While the invention has been particularly shown and described with reference to a preferred embodiment, it will be understood by those skilled in the art that various changes in form and detail may be made therein without departing from the spirit and scope of the invention.

What is claimed is:

1. A method, comprising:
providing a convertible tablet computer with a plurality of microphones to form a microphone array capable of operating in a sound emphasis mode during which sound signals collected by said microphones are processed while forming an emphasis space and capable of operating in a non-processing mode during which sound signals collected by said microphones are processed without forming said emphasis space;
allowing said tablet computer in a PC use mode to operate in said sound emphasis mode;
determining whether or not a user mode of said tablet computer has been changed from said PC use mode to a tablet use mode; and
in response to a determination that said tablet computer has been changed from said PC use mode to said tablet use mode, processing said emphasis space to allow sound signals collected by said microphones to be utilized in said tablet use mode.

2. The method of claim 1, wherein said processing includes transitioning to said non-processing mode from said sound emphasis mode.

3. The method of claim 1, wherein said method further includes in response to a determination that said tablet computer has been changed from said tablet use mode to said PC use mode, transitioning to said sound emphasis mode from said non-processing mode.

4. The method of claim 1, wherein said processing includes setting both or either one of an axis of directivity and a directivity coverage angle of said emphasis space to a value different from those in said PC use mode.

5. The method of claim 4, further comprising
detecting, by said tablet computer, a direction of a display screen in said tablet use mode; and
changing a direction of said axis of directivity according to said detected direction of said display screen.

6. The method of claim 5, further comprising
detecting, by said tablet computer, a tilt angle of said tablet computer; and
changing a direction of said axis of directivity according to said detected tilt angle.

7. The method of claim 6, further comprising
detecting, by said tablet computer, a jolting of said tablet computer; and
in response to said detected jolt, setting a magnitude of said directivity coverage angle of said emphasis space to be greater than the value in said PC use mode.

8. A convertible tablet computer comprising:
a plurality of microphones forming a microphone array;
sound data creation module for generating sound data from sound signals collected by said plurality of microphones;
sound processing module for forming an emphasis space to process sound data received from said sound data creation module;
mode detection module for detecting said tablet computer being in a PC use mode or in a tablet use mode;
sound utilization module for receiving and utilizing sound data from said sound data creation module or said sound processing module; and
control module for controlling said sound processing module to allow said sound utilization module to receive sound data from said sound data creation module or said sound processing module, in response to said mode detection module detecting said tablet use mode when said sound utilization module is receiving sound data from said sound processing module in said PC use mode.

9. The tablet computer of claim 8, wherein said control module supplies said sound data from said sound data creation module to said sound utilization module in response to said mode detection module detecting said tablet use mode.

10. The tablet computer of claim 9, wherein said control module supplies said sound data from said sound processing module to said sound utilization module in response to said mode detection module detecting said PC use mode.

11. The tablet computer of claim 8, wherein said control module controls said sound processing module to set both or either one of an axis of directivity and a directivity coverage angle of said emphasis space to a value different from those in said PC use mode.

12. The tablet computer of claim 11, wherein said control module changes a direction of said axis of directivity according to information representing said direction of said screen received from a displaying direction detecting module.

13. The tablet computer of claim 11, wherein said control module changes said direction of said axis of directivity according to a tilt angle information received from a tilt angle measuring module.

14. The tablet computer of claim 13, wherein said control module sets a magnitude of said directivity coverage angle to be greater than said value in said PC use mode, in response to a jolting of said tablet computer detected based on said tilt angle information that is periodically received from a tilt angle measuring module.

15. A computer readable medium having a computer program product for permitting a convertible tablet computer having a plurality of microphones to form a microphone array capable of operating in a sound emphasis mode during which sound signals collected by said microphones are processed while forming an emphasis space and capable of operating in a non-processing mode during which sound signals collected by said microphones are processed without forming said emphasis space, said computer readable medium comprising:
computer program code for allowing said tablet computer in a PC use mode to operate in said sound emphasis mode;

computer program code for determining whether or not a user mode of said tablet computer has been changed from said PC use mode to a tablet use mode; and computer program code for, in response to a determination that said tablet computer has been changed from said PC use mode to said tablet use mode, processing said emphasis space to allow sound signals collected by said microphones to be utilized in said tablet use mode.

* * * * *